Patented Feb. 21, 1939

2,148,135

UNITED STATES PATENT OFFICE 2,148,135

DYE

Swanie S. Rossander, Wilmington, Del., assignor to E. I. du Pont de Nemours & Company, Wilmington, Del., a corporation of Delaware No Drawing. Application January 23, 1937, Serial No. 122,030

4 Claims. (Cl. 260—160)

A. This invention relates to disazo dyes. More particularly the invention relates to dyes having a di(aminoaroyl) benzene-diamine nucleus and having end components with free amino groups. The invention will be described with respect to particular examples, but the particularity of the description does not limit the invention beyond the scope of the appended claims.

B. An object of the invention is to produce dyestuffs which dye cotton, regenerated cellulose, and related substances directly from a water bath. Another object of the invention is to produce the new dyestuffs by methods which are technically and economically satisfactory. Other objects of the invention will be in part apparent and in part elsewhere herein set forth.

C. The objects of the invention are accomplished by diazotizing both amino groups of a di(amino-aroyl) benzene-diamine and coupling it to coupling components which contain at least one free amino group.

D. The following examples are illustrative, not limitative, of this invention.

Example I 16.5 parts of di-(para-amino-benzoyl) 1.3-diamino-benzene were slurried with 400 parts of water, 25 parts of 10 normal hydrochloric acid were admixed therewith, the whole was warmed until solution was completed, was cooled to 5° C., and 50 parts of 2 normal sodium nitrite solution was added as rapidly as it was absorbed. Congo red acidity, and an excess of sodium nitrite was maintained for 25 minutes at 5–10° C. 24 parts of J-acid were slurried with 400 parts of water, 5.3 parts soda ash were added until a solution slightly acid to litmus was obtained. 160 parts of 2 normal soda ash solution were added to the J-acid solution, the mixture was warmed to 70° C., and salt was added on a basis of 10% by weight of the volume. Filtering and drying of the product at 90–100° C. produced a dry, orange red powder, listed as product No. 11 in the table. It is represented by the formula:

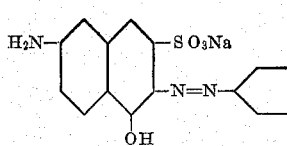
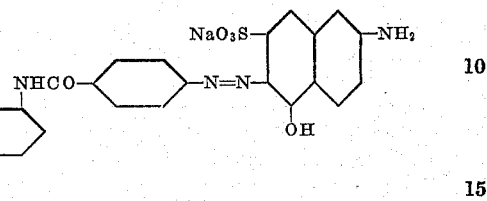

Example II 13.5 parts of di(para-amino-benzoyl 1:3-diamino benzene-4-sulfonic acid were slurried with 400 parts of water at 20° C., 8 parts of 10 N. caustic soda at 25° C. were added and brought into solution. The whole was cooled with ice to 8° C., and 20 parts of 10 normal hydrochloric acid, and 30 parts of 2 N. sodium nitrite solution were added. A slight excess of nitrite was maintained for 20 minutes at 8–10° C.

12.5 parts of 1-meta-amino-phenyl-3-methyl-5-pyrazolone were slurried with 300 parts of water, enough soda ash was added to bring slight alkalinity on Brilliant Yellow paper, 130 parts of 2 normal soda ash solution were admixed, and the whole was cooled to 10° C.

The tetrazo solution was slowly added to the solution of 1-meta-amino-phenyl-3-methyl-5-pyrazolone, 15 minutes being required. Strong alkalinity to Brilliant Yellow paper and an excess of coupling component were maintained. The mass was agitated for three hours, slowly warmed to 75° C., 10% salt by volume were added and the precipitate was filtered and dried at 90–100° C.

The dried product was reddish orange in appearance. Its dyeing properties are described under product No. 32 in the accompanying table. It is represented by the formula:

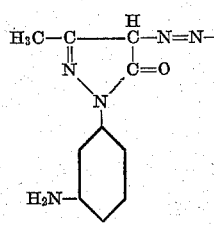
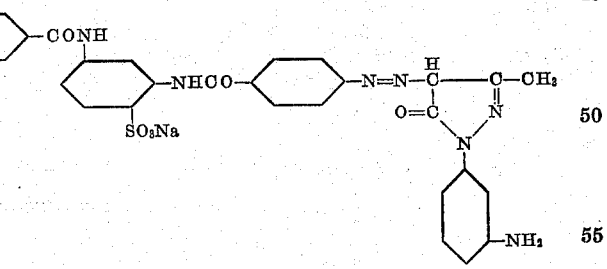

Example III 79.2 parts of di-para amino benzoyl meta phenylene diamine were slurried with 3000 parts of water for one hour, 36.5 parts of hydrochloric acid were added and the mass stirred 15 minutes. The whole was cooled to 10° C. by adding ice and 27.6 parts of sodium nitrite were added as rapidly as absorbed. A distinct excess of nitrite was maintained for one-half hour at 10° C.

83 parts of 1-meta amino phenyl-5-pyrazolone-3-carboxylic acid were added to 3000 parts of water and then 23.3 parts of soda ash were added to bring a clear solution slightly alkaline to Brilliant Yellow paper. 120 parts of soda ash were added and the whole stirred to solution and cooled to 0° C. by adding ice. The above prepared

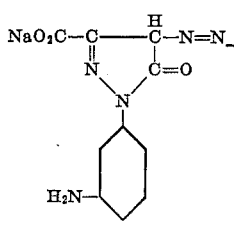

tetrazo di(para amino benzoyl) meta phenylene diamine was added to the well agitated solution during one half hour and stirred two hours, allowing it to come to room temperature. Strong alkalinity on Brilliant Yellow paper and an excess of 1-meta amino phenyl-5-pyrazolone-3-carboxylic acid were maintained. The mass was slowly heated to 70° C., salt 10% by volume was added and the precipitate was filtered, and dried at 90–95° C. The dye is represented by the formula:

Example IV 42.6 parts of di(meta amino benzoyl) 1-3-diamino benzene-4-sulfonic acid were slurried with 3500 parts of water for one hour, and 11 parts of caustic soda were added. The solution was made distinctly alkaline to Brilliant Yellow paper and cooled to 10° C. by adding ice. 26 parts of hydrochloric acid were added and immediately 15 parts of sodium nitrite were added. Congo acidity and a strong excess of nitrite were maintained for one hour at 10° C.

46 parts of 1-meta amino phenyl-5-pyrazolone-3-carboxylic acid were slurried with 1000 parts of water for one hour and 23.5 parts of soda ash were added. The solution was made clear and slightly alkaline to Brilliant Yellow paper. 47 parts of soda ash were added and stirred until dissolved and the mass was cooled to 0° C. by addition of ice.

The tetrazo of di(meta amino benzoyl) 1-3-diamino benzene-4-sulfonic acid was slowly added to the solution of 1-meta amino-phenyl-5-pyrazolone-3-carboxylic acid during one-half hour, and an excess of 1-meta amino phenyl-5-pyrazolone-3-carboxylic acid was maintained. The whole was stirred for 2 hours, and slowly warmed to 75° C. Salt 10% by volume was added, the precipitate was filtered, and dried at 90–95° C. The dried product was a yellow solid. The dye is represented by the formula:

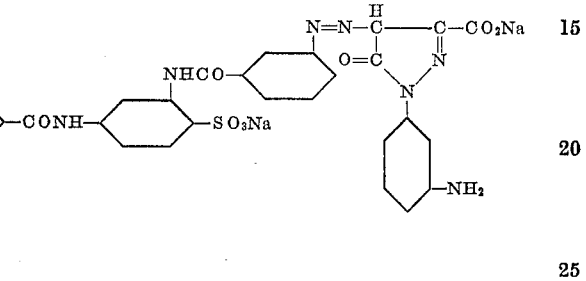

Example V 42.6 parts of di-(para amino benzoyl) 1-3-diamino benzene-4-sulfonic acid were slurried with 3500 parts of water for one hour and 11 parts of caustic soda were added. The solution was made distinctly alkaline to Brilliant Yellow paper. The whole was cooled to 10° C. by adding ice. 26 parts of hydrochloric acid were added and immediately 15 parts of sodium nitrite were added. Congo acidity and a strong excess of nitrite were maintained for one hour at 10° C.

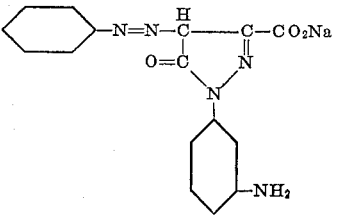

79 parts of para amino benzoyl J-acid were slurried with 1500 parts of water and 4.2 parts of ammonia added until the solution was dissolved, leaving the solution slightly alkaline to Brilliant Yellow paper. 4.3 parts of sodium bicarbonate were added and then 59 parts of soda ash were added and the whole cooled to 0° C. by adding ice.

The tetrazo di-(para amino benzoyl) 1-3-diamino benzene-4-sulfonic acid were added to the para amino benzoyl J-acid solution during one half hour. An excess of para amino benzoyl J-acid and strong carbonate alkalinity were maintained and the mass stirred 2 hours and slowly heated to 75° C. Salt 10% by volume were added and the precipitate filtered and dried at 90–95° C. The dye is represented by the formula:

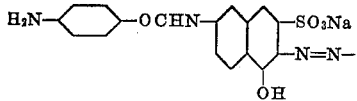

Example VI 42.6 parts of di-(para amino benzoyl) 1-3-diamino benzene-4-sulfonic acid were slurried with 3500 parts of water for one hour and 11 parts of caustic soda were added. The solution was made distinctly alkaline to Brilliant Yellow paper and the whole cooled to 10° C. by adding ice. 26 parts of hydrochloric acid were added and immediately 15 parts of sodium nitrite were added. Congo acidity and a strong excess of nitrite were maintained for one hour at 10° C.

79 parts of meta amino benzoyl J-acid were slurried with 1500 parts of water and 4.2 parts of of ammonia were added until the solution was dissolved, leaving the solution slightly alkaline to Brilliant Yellow paper. 4.3 parts of sodium bicarbonate were added and 59 parts of soda ash were added. The mass was cooled to 0° C. by adding ice.

The tetrazo di-(para amino benzoyl) 1-3-diamino benzene-4-sulfonic acid was slowly added to the meta amino benzoyl J-acid solution during one-half hour. An excess of meta amino benzoyl J-acid and a strong carbonate alkalinity were maintained. The mass was stirred 2 hours and slowly heated to 75° C. Salt 10% by volume was added and the precipitate was filtered and dried at 90–95° C. The dye is represented by the formula:

as they do not interfere with the condensation of both amino groups. Amino aroyl usually consists of p-amino benzoyl or m-amino-benzoyl, but o-amino-benzoyl can be used. The aryl nuclei of the aroyl may also contain the said substituent groups.

G. The two moles of coupling components, usually required for coupling to the diazo components, may consist of like or unlike intermediates. The latter need not necessarily be used in equimolecular proportions.

H. The coupling components are subject to wide variation, but must contain a free amino group, preferably one capable of diazotization after the intermediate has been coupled to the diazo component. Among the utilizable coupling components are amino and hydroxy amino aryl compounds and amino aryl derivatives of pyrazolones, aryl being preferably benzene or naphthalene. Substituent groups, such as halogen, alkyl, alkoxy, aryl, alphyl, carboxy, and sulfonic acid, may be present in the nucleus.

I. The products of this invention include water-soluble products, certain of which, particularly those of the preferred embodiments, are useful for the direct dyeing of cotton and regen-

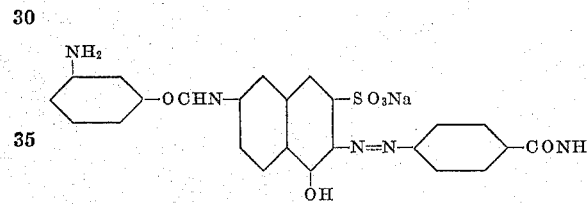
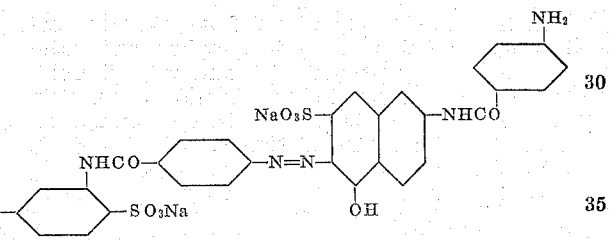

E. Following in general the principles involved in the preceding examples, a great many compounds of this type were prepared, of which the following table lists examples.

erated cellulose. They are frequently used in the form of their alkali metal salts.

J. The preferred type of coupling component comprises amino and hydroxy derivatives of

| | Tetrazo of— | Coupled to— | Direct shade of dye |
|---|---|---|---|
| 7 | Di (para-amino-benzoyl) 1:3-diamino benzene | Two moles of para-amino benzoyl J-acid | Orange. |
| 8 | ……do…… | Two moles of meta-amino benzoyl J-acid | Do. |
| 9 | ……do…… | Two moles of J-acid | Red. |
| 10 | ……do…… | Two moles of 1-meta-amino-phenyl-5-pyrazolone-3-carboxylic acid | Yellow. |
| 11 | ……do…… | One mole of para-amino-benzoyl J-acid. One mole of meta-amino-phenyl-5-pyrazolone-3-carboxylic acid. | Do. |
| 12 | ……do…… | Two moles of di (para-amino-benzoyl) 3:5-diamino benzoyl J-acid | Orange. |
| 13 | Di (para-amino-benzoyl) 1:4-diamino benzene | J-acid | Red. |
| 14 | Di (para-amino-benzoyl) 1:3-diamino-benzene-4-sulfonic acid. | Two moles of 1-meta-amino-phenyl-5-pyrazolone-3-carboxylic acid. | Yellow. |
| 15 | ……do…… | Two moles of meta-amino-benzoyl J-acid | Orange. |
| 16 | ……do…… | Two moles of para-amino-benzoyl J-acid | Do. |
| 17 | ……do…… | Two moles of 1-meta-amino-phenyl-3-methyl-5-pyrazolone | Yellow. |
| 18 | ……do…… | One mole of 1-meta-amino-phenyl-5-pyrazolone-3-carboxylic acid. One mole PAB J-acid. | Do. |
| 19 | ……do…… | Two moles of meta-toluidine | Red orange. |
| 20 | ……do…… | Two moles of di(para-amino benzoyl) 3:5-diamino benzoyl J-acid. | Red. |
| 21 | Di(para-amino-benzoyl) 1:4-diamino-benzene-5-sulfonic acid. | Two moles of para-amino-benzoyl J-acid | Orange. |
| 22 | ……do…… | Two moles of meta-amino-benzoyl J-acid | Do. |
| 23 | ……do…… | Two moles of 1-meta-amino-phenyl-5-pyrazolone-3-carboxylic acid. | Yellow. |
| 24 | ……do…… | Two moles of 1-meta-amino-phenyl-3-methyl-5-pyrazolone | Do. |
| 25 | ……do…… | J-acid | Red. |
| 26 | Di (meta-amino-benzoyl) 1:3-diamino-benzene-4-sulfonic acid. | Two moles of meta-amino-benzoyl J-acid | Orange. |
| 27 | ……do…… | Two moles of para-amino-benzoyl J-acid | Do. |
| 28 | ……do…… | Two moles 1-meta-amino-phenyl-5-pyrazolone-3-carboxylic acid | Yellow. |
| 29 | ……do…… | Two moles of 1-meta-amino-phenyl-3-methyl-5-pyrazolone | Do. |
| 30 | One mole of Example 21 | Two moles of 1-meta-amino-phenyl-5-pyrazolone-3-carboxylic acid. | Do. |
| 31 | One mole of Example 10 | Two moles of 1-meta-amino-phenyl-5-pyrazolone-3-carboxylic acid. | Do. |

F. The diazo components consist of di(aminoaroyl)-benzene diamines. The benzene nucleus may contain substituents, such as sulfonic, alkyl, alkoxy, halogen, oxyacetic acid, or azo so long benzene and naphthalene. Sulfonic acid groups are preferably present as substituent groups, particularly in naphthalene nuclei.

K. Amino-naphthol sulfonic acids, particularly 2-amino-5-naphthol-7-sulfonic acid (J-acid)

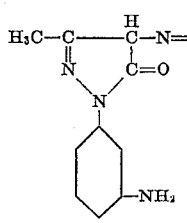

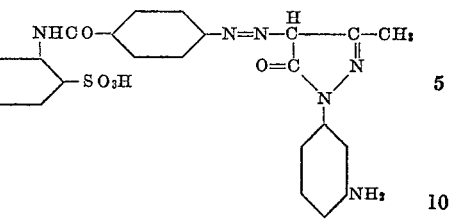

and N-(p-amino-benzoyl) derivatives give some of the most highly preferred combinations.

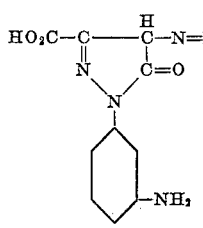

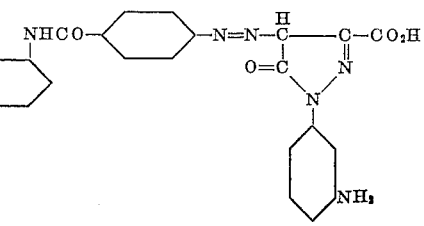

L. As many apparently widely different embodiments of this invention may be made without departing from the spirit and scope thereof, it is to be understood that I do not limit myself to the specific embodiments thereof except as defined in the appended claims.

I claim:

1. The compound represented by the formula:

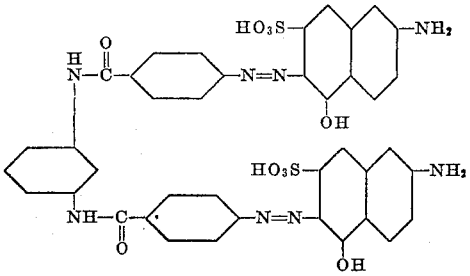

2. The compound represented by the formula:

3. The compound represented by the formula:

4. A compound represented by the formula:

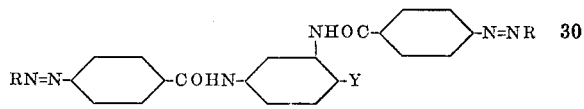

in which each R is a radical of a primary arylamine of the group consisting of an amino naphthol sulfonic acid, 1-meta-amino-phenyl-5-pyrazolone-3-methyl, and 1-meta-amino-phenyl-5-pyrazolone-3-carboxyl, and Y is one of a group consisting of hydrogen and sulfonic acid.

SWANIE S. ROSSANDER.